United States Patent [19]
Connor et al.

[11] Patent Number: 5,594,705
[45] Date of Patent: Jan. 14, 1997

[54] ACOUSTIC TRANSFORMER WITH NON-PIEZOELECTRIC CORE

[75] Inventors: Denis J. Connor; Gerald F. Cummings, both of Vancouver; Michael J. Star, Richmond, all of Canada

[73] Assignee: Dynamotive Canada Corporation, Vancouver, Canada

[21] Appl. No.: 192,395

[22] Filed: Feb. 4, 1994

[51] Int. Cl.⁶ .................................................. H04B 17/00
[52] U.S. Cl. ............................. 367/13; 310/319; 310/334
[58] Field of Search ....................... 367/13, 191, 140, 367/137; 381/64, 65, 190; 310/321, 322, 323, 328, 334, 316, 317, 319; 73/587, 594, 632

[56] References Cited

U.S. PATENT DOCUMENTS

| 3,239,678 | 3/1966 | Kolm et al. | 310/319 |
|---|---|---|---|
| 3,350,583 | 10/1967 | Schiavone | 310/319 |
| 3,365,593 | 1/1968 | Roof et al. | 310/319 |
| 3,445,750 | 5/1969 | Uthe, Jr. et al. | 323/268 |
| 3,636,456 | 1/1972 | Wright | 324/600 |
| 3,708,745 | 1/1973 | McMaster et al. | 310/318 |
| 3,906,780 | 9/1975 | Baldwin | 310/334 |
| 3,946,256 | 3/1976 | Day et al. | 310/334 |
| 4,156,158 | 5/1979 | Wilson et al. | 310/334 |

Primary Examiner—Ian J. Lobo
Attorney, Agent, or Firm—Shlesinger, Arkwright & Garvey

[57] ABSTRACT

A transformer for transmitting energy across a medium, comprised of a primary transducer juxtaposed to the first side of the medium, a secondary transducer juxtaposed to the medium on a second side opposite to the first side and a generator coupled to the primary transducer for applying a driving signal thereto.

19 Claims, 3 Drawing Sheets

ACOUSTIC TRANSFORMER WITH NON-PIEZOELECTRIC CORE

BACKGROUND

The present invention relates to an acoustic transformer for coupling energy through a non-piezoelectric medium.

There are many, applications in which it is desirable to sense conditions on one side of an isolating medium and transmit them to the other side of the medium without physically penetrating the medium itself. For example, it is desirable to be able to sense the hydrostatic pressure on the hull of a ship or submarine without compromising the integrity of the hull itself which would result by the installation of through-hull pressure transducers.

Transmission of power and/or information across a medium such as a ship's hull without physically penetrating the medium suggests the use of a transmitting means other than electricity, such as an acoustic wave. Such a means would require the use of some type of acoustic transceiver on one side of the barrier and a corresponding transceiver on the other. Such transceivers may involve the use of piezoelectric transducers. The combination of piezoelectric transceivers and associated circuitry form an acoustic transformer. Transformers with a piezo-electric core couple electrical energy from the primary to the secondary with high efficiency while inherently providing galvanic isolation between primary and secondary.

The principal of operation of such transformers involves the conversion of electrical energy to acoustic energy in the primary of the transformer and the coupling of the latter energy to the secondary of the transformer where the acoustic energy in the secondary is converted to electrical energy. The acoustically conductive and electrically non-conductive piezo-ceramic material takes the place of the conventional transformer's magnetically and electrically conductive core. Acoustic transformers may be of a variety of shapes including toroidal, a thin elongated rectangular wafer, disc-shaped, etc. Moreover, the leads and conductive pads may be placed in any number of configurations.

Depending upon the shape of the material and the configuration of the conductive pads one can achieve a variety of input and output impedances, frequency and voltage step-up. Piezoelectic transformers achieve efficiencies of about 90% at or near resonance. At resonance a square wave input will produce a sinusoidal output voltage and current at the resonance frequency. Consequently, operation is generally selected to be at resonance. Typically a resonator sends acoustical energy along the material at about 150 kHz. At the other end, an identical resonator receives the acoustical energy and converts it back to electrical energy. After rectification and filtering, the electrical energy may be used to power an amplifier or other circuit.

Unfortunately, known piezoelectric transformers utilize a single core of piezoceramic material. The problem becomes how to utilize such a structure across a medium which cannot be penetrated.

Accordingly, it is an object of the present invention to provide an improved method and apparatus for transmitting energy across a medium without penetrating the medium.

SUMMARY OF THE INVENTION

According to the invention there is provided a transformer for transmitting energy through a medium which includes a primary transducer coupled to one side of the medium and a secondary transducer coupled to the other side of the medium. A generator is coupled to the primary transducer and applies an AC driving signal thereto. Means for varying the load across the secondary transducer cause variations in the driving signal across the primary transducer to be induced.

A rectifier and filter circuit may be coupled to an output of the secondary transducer to provide a DC source on a secondary side of the medium.

A switch may be included across the secondary transducer for varying the load across the secondary transducer in response to a control signal. A demodulator may be advantageously provided across the primary transducer to detect changes in voltage across and current through this primary transducer caused by changes in load across the secondary transducer.

Preferably a sensor is provided for sensing a physical condition on a secondary side of the medium and for generating the control signal. The physical condition may be pressure, temperature, the presence of objects, vibration, etc.

The switch may be an FET having a source connected to one lead of the secondary transducer, a drain connected to another lead of the secondary transducer, a gate driver or modulator coupled to the gate and a digital sensor signal source coupled to the modulator.

A backing mass may be coupled to each of the primary and secondary transducers on a side opposite a side of attachment of a corresponding one of the transducers to the medium.

The frequency of the AC driving signal may be at or near the resonant frequency of the primary and secondary transducers.

The transducers are preferably piezoelectric transducers.

BRIEF DESCRIPTION OF THE. DRAWINGS

The novel features believed characteristic of the invention are set forth in the appended claims. The invention itself, as well as other features and advantages thereof, will be best understood by reference to the description which follows read in conjunction with the accompanying drawings, wherein:

DETAILED DESCRIPTION WITH REFERENCE TO THE DRAWINGS

Figure 1:
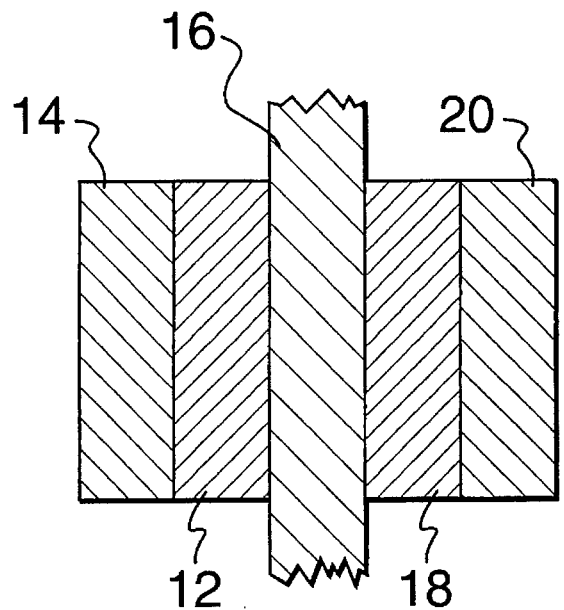
FIG. 1 is a cross-sectional drawing showing the acoustical energy transformer.

Referring to FIG. 1 there is shown the acoustic transformer as installed on the hull 16 of a ship (not shown). A primary piezoelectric transducer 12 is mounted against the inside of the hull 16 with a backing mass 14 glued to the back of the transducer 12. On the side of the hull 16 opposite transducer 12 there is located a secondary transducer 18 with its own backing mass 20 coupled thereto. The backing masses enhance the efficiency of the transceiver as they provide inertia which causes changes in the piezoelectric transducer to effect a stronger coupling to the hull. In operation acoustic vibrations developed in transducer 12 by an oscillator electrically coupled to transducer 12 couple to the hull 16. The vibrations developed in hull 16 then couple to the transducer 18 where vibrations are produced which are then converted to electrical signals by electrical leads affixed to transducer 18.

Figure 2:
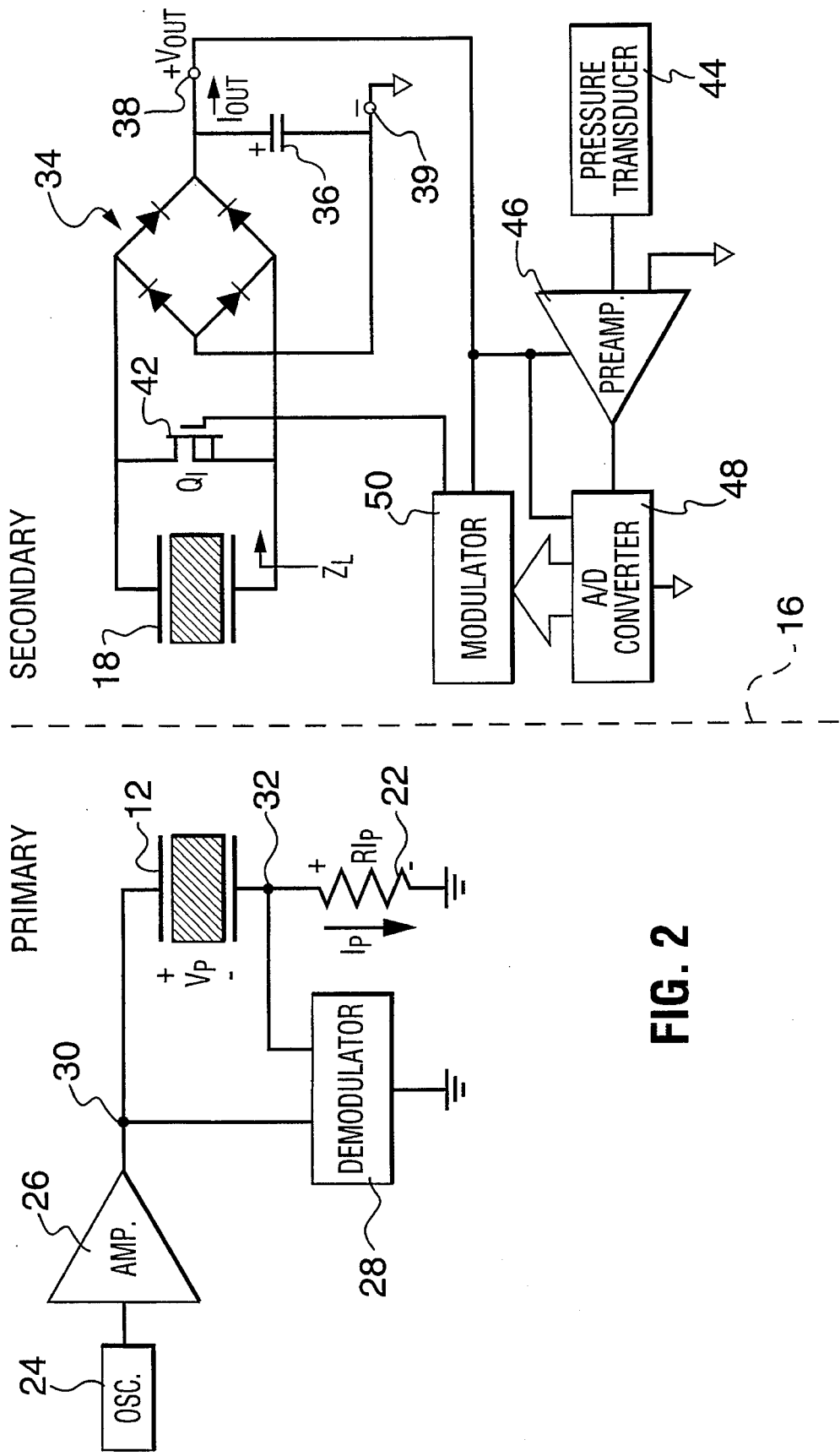
FIG. 2 is a schematic diagram showing the transformer used in conjunction with a ship's hull.

The electrical arrangement associated with the physical structure of FIG. 1 is seen in FIG. 2. Coupled to the primary transducer 12 is an oscillator 24 and amplifier 26. The output of the amplifier 30 connects to a conductive pad on the transducer 12. A resistance R 22 couples the other pad on the transducer 12 at point 32 to ground and is used to measure current through the transducer 12. A demodulator 28 connects across the transducer 12 at 30 and 32 so as to detect the electrical signal induced by the secondary transducer Signals induced in the secondary transducer 18 are rectified by diode bridge 34, filtered by filter capacitor 36 and available as a DC voltage across terminals 38 and 39. This voltage, $V_{out}$, is used to power the preamplifier 46, the A/D converter 48, modulator 50, etc. A Field Effect Transistor (FET) 42 whose source and drain are connected across the electrodes of the secondary transducer 18 acts as a switch to short across the latter transducer 18. The gate of FET 42 is driven by signals from a pressure transducer 44 which are fed to a preamplifier 46. The amplified signal from the preamplifier 46 goes to an analog to digital converter 48 which digitizes the signal and directs it to modulator 50. Modulator 50 formats the signal with synchronizing bits, identifying bits and other overhead bits and drives the gate of FET 42.

Thus, the instantaneous signal from pressure transducer 44 is digitized and the digital pulses used to switch FET 42. Demodulator 28 then simply detects the changes effected on the primary transducer 12 by short circuiting of the secondary transducer 18. The analog value of these detected digital signals indicates the instantaneous pressure as detected by pressure transducer 44.

Figure 3:
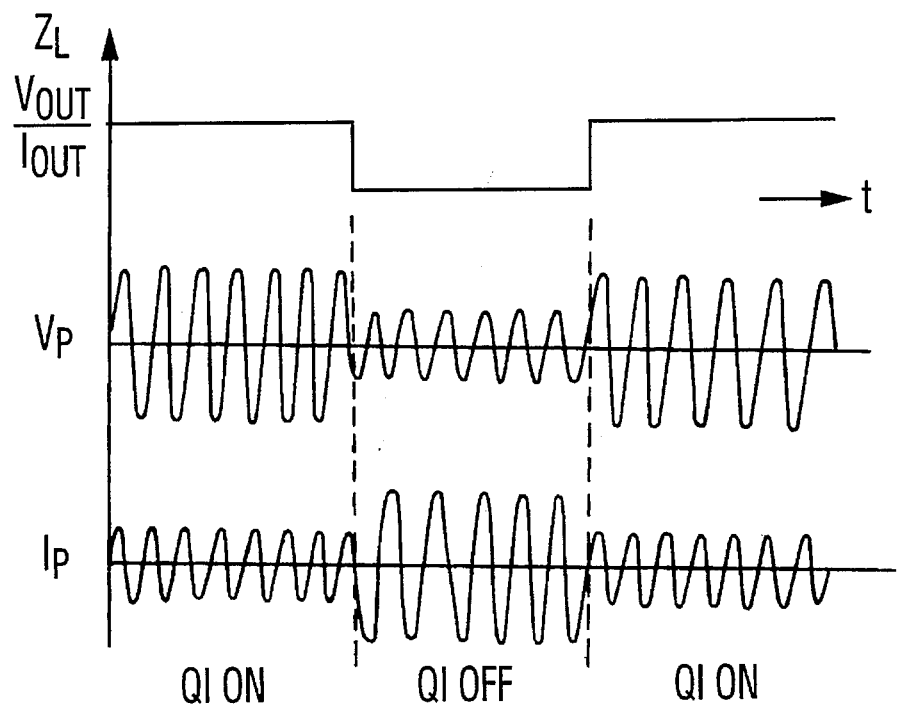
FIG. 3 is a set of wave forms showing the effect of short circuiting the secondary.

Referring to FIG. 3 there is shown the voltage and current wave forms at the primary of the voltage across the transducer 12 and the current through it $I_p$. The latter wave forms are shown as a function of the state of FET 42 being ON or OFF. It will be observed that the voltage $V_p$ is higher when the FET 42 is OFF than when it is ON whereas the current $I_p$ behaves in the opposite way. These changes in $V_p$ or $I_p$ are detected by demodulator 28 and give the digital value of the pressure sensed by pressure transducer 44.

Figure 4:
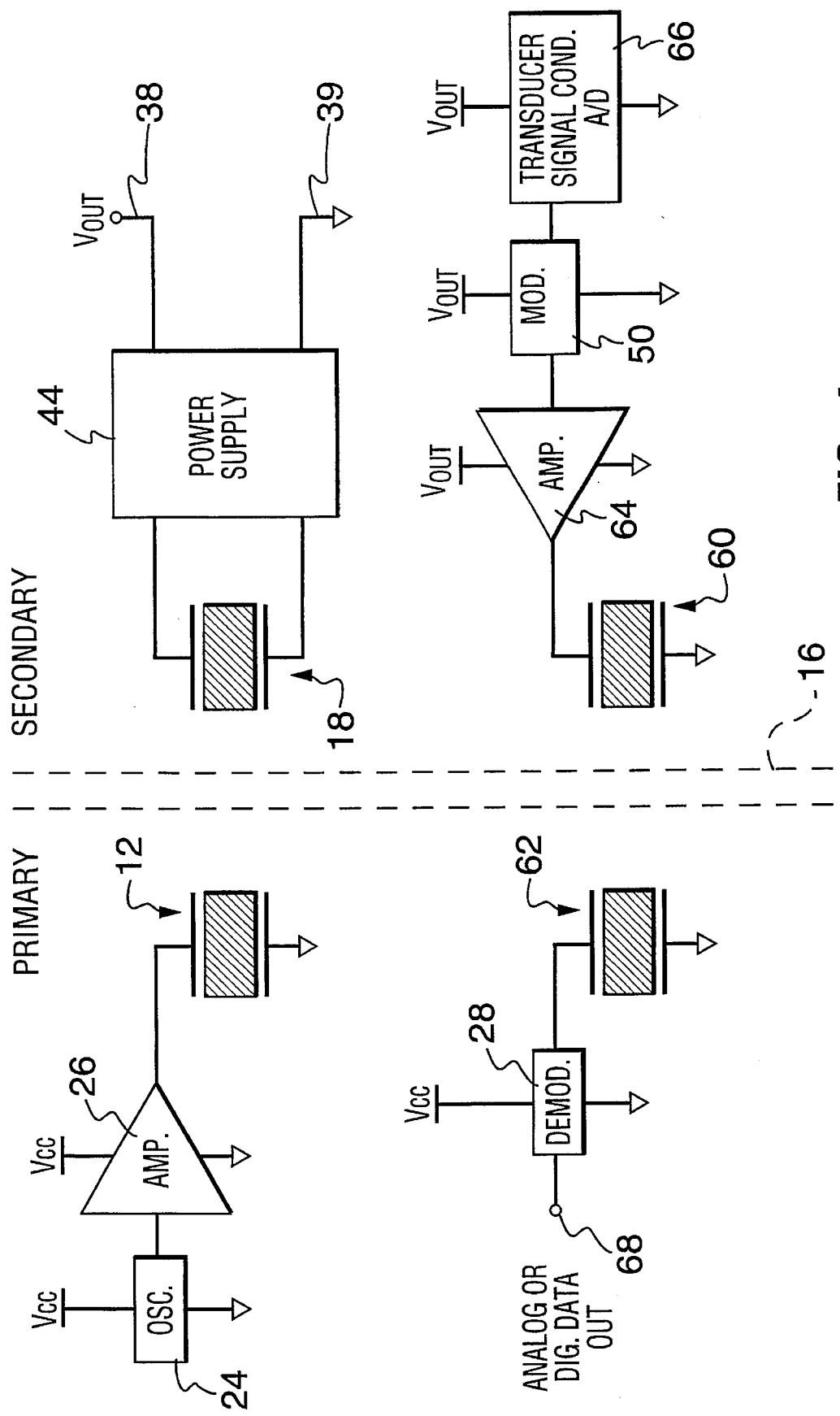
FIG. 4 is a schematic diagram showing a serial switch in combination with the circuit of FIG. 2.

Obviously, other physical parameters may be sensed such as temperature, light intensity, etc. In fact, FIG. 4 shows one scheme in which two different transformers are used, one for the power path and one for a data path. The top half of FIG. 4 shows the power path in which a power supply 44 includes the diode bridge and filter capacitor shown in FIG. 2. Again $V_{out}$ is used to power components in the data path which is the lower one of FIG. 4. In the data path, a physical parameter is sensed by the transducer in block 66 and the signal amplified and conditioned and then digitized by the analog to digital converter therein. A modulator 50 then applies a carrier signal to the one from block 66 and directs the modulated signal to an amplifier 64 and then to transducer 60. On the primary side of medium 16 another transducer 62 senses the acoustic signal from transducer 60, demodulates it and outputs the data on line 68. Obviously, the circuit could operate with analog signals rather than digital ones.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modification or embodiments as fall within the true scope of the invention.

I claim:

1. A transformer for transmitting energy across a medium, comprising:
    (a) a primary transducer juxtaposed to a first side of the medium;
    (b) a secondary transducer juxtaposed to said medium on a second side thereof opposite to said first side;
    (c) a generator coupled to said primary transducer for applying an AC driving signal thereto; and
    (d) means for varying the load across said secondary transducer so as to induce variations in said AC driving signal across said primary transducer.

2. A transformer according to claim 1, including a rectifier and filter circuit coupled to an output of said secondary transducer to provide a DC power supply on a secondary side of said medium.

3. A transformer according to claim 1, wherein said varying means includes a switch across the secondary transducer for varying the load across the latter in response to a control signal and a demodulator across the primary transducer operative to detect changes in voltage and current induced across said primary transducer by varying the load.

4. A transformer according to claim 3, including a sensor for sensing a physical condition on the second side of the medium and generating said control signal in response to a magnitude of the condition sensed.

5. A transformer according to claim 4, including a gate driver or modulator, a sensor signal source coupled to said modulator and wherein said switch is an FET having a source connected to one lead, a drain connected to another lead of said secondary transducer, a gate coupled to said driver or modulator.

6. A transformer according to claim 5, wherein said sensor signal source includes a sensor and an analog to digital converter coupled to an output of said amplifier.

7. A transformer according to claim 1, including a backing mass coupled to each of said primary and secondary transducers on a side opposite a side of attachment of a corresponding one of said transducers to said medium.

8. A transformer according to claim 1, wherein the frequency of the AC, driving signal from said generator is at or near the resonant frequency of said transformer.

9. A transformer for transmitting energy across a medium, comprising:
    (a) a primary piezoelectric transducer coupled to one side of said medium;
    (b) a secondary piezoelectric transducer coupled to an opposite side of said medium;
    (c) means for generating an AC signal driving across said primary transducer;
    (d) means for varying the load on said secondary transducer;
    (e) detecting means for detecting changes in current through and voltage across said primary transducer due to varying the load on said secondary transducer;
    (f) a rectifier and filter at an output of said secondary transducer operative to produce a source of DC voltage on said opposite side.

10. A transformer according to claim 9, including two backing masses coupled to respective ones of said primary and secondary transducers on a side of associated ones of said primary and secondary transducers opposite a side of attachment of each of said transducers to said medium.

11. A transformer according to claim 9, wherein said varying means is a switch across electrical leads of said secondary transformer.

12. A transformer according to claim 9, including means for shorting across electrical leads of said secondary transducer at a rate proportional to the magnitude of a sensed signal and means for detecting the rate of shorting on said primary transducer.

13. A transformer according to claim 9, wherein the frequency of said AC driving signal is at or near the resonant frequency of said primary and secondary transducers.

14. A transformer according to claim 12, wherein said shorting means includes an FET coupled across said secondary transducer, a sensor for sensing a physical parameter and form generating an electrical signal proportional to the magnitude of the parameter, an analog to digital converter coupled to an output of said sensor for converting the sensed analog signal to a digital one and a modulator coupled to an output of said analog to digital converter with an output of said modulator driving a gate of said FET.

15. A transformer according to claim 9, wherein said load varying means is an FET connected in series with said rectifier.

16. A transformer assembly for transmitting energy across a medium, comprising:
   (a) a piezoelectric power transducer coupled one side of said medium;
   (b) a secondary power piezoelectric transducer coupled to a second side opposite said one side of said medium;
   (c) means for generating an AC signal across said primary power transducer so as to induce a signal in said secondary power transducer;
   (d) means for rectifying and filtering the signal induced in said secondary power transducer so as to provide a DC power supply for circuits on the side of said medium;
   (e) means for generating a signal proportional to the magnitude of a sensed condition on the second side;
   (f) a primary data transducer on the second side of said medium coupled to an output of said generating means;
   (g) a secondary data transducer on the one side of said medium positioned so as to receive an induced signal from said primary data transducer; and
   (h) a demodulator coupled to the secondary data transducer for demodulating the induced signal therefrom.

17. A transformer assembly according to claim 16, wherein said generating means includes a signal conditioning circuit, a modulator, and an amplifier coupled to said primary data transducer.

18. A transformer assembly according to claim 17, including a transducer on the second side for sensing the magnitude of a physical condition and for producing a signal in proportion thereto.

19. A method of transmitting energy across a medium comprising,
   (a) driving a primary transducer on one side of a medium with a varying signal so as to induce a corresponding signal in a secondary transducer positioned on a second side of the medium; and
   (b) detecting the magnitude of a physical condition on the second side of the medium;
   (c) generating a sensor signal proportional to the magnitude of the physical condition;
   (d) varying the load on the secondary transducer in response to the magnitude of the generated sensor signal; and
   (e) detecting a primary side signal induced in said primary transducer produced as a result of varying the load on the secondary transducer.

* * * * *